United States Patent Office 3,006,484
Patented Oct. 31, 1961

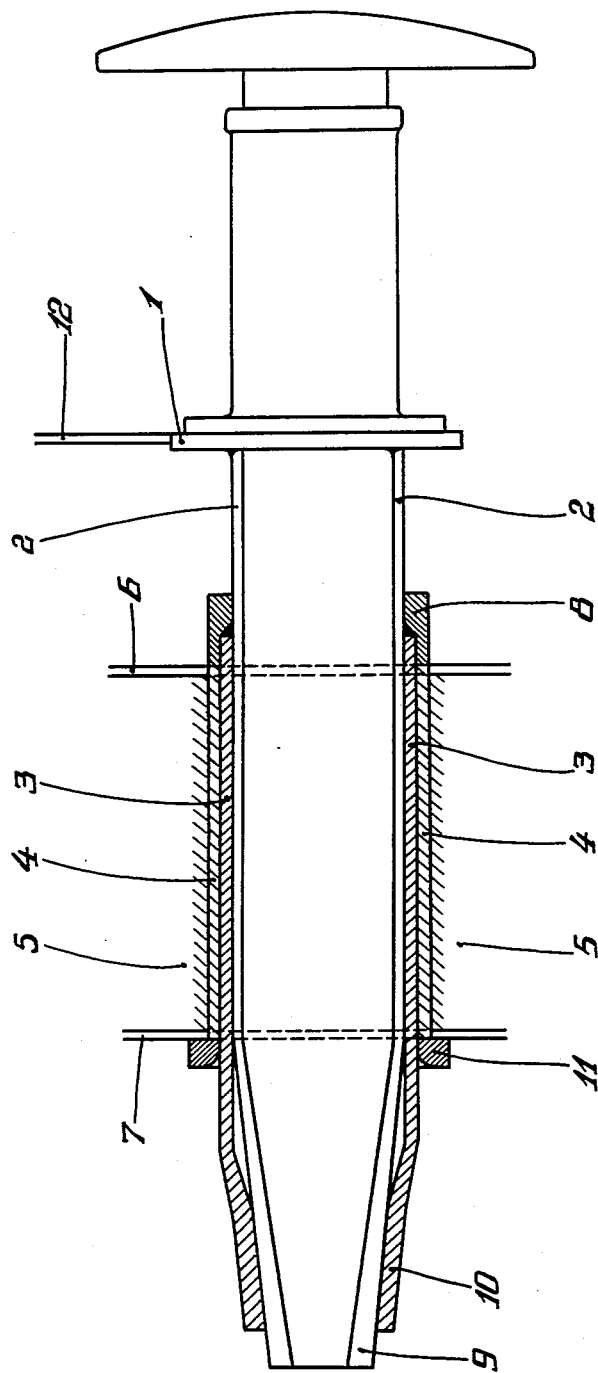

3,006,484
DEVICES FOR RAILWAY VEHICLES DESIGNED TO WITHSTAND LONGITUDINAL BUFFERING STRESSES
Paul Marie Gabriel Alphonse Pringiers, Angleur, Belgium, assignor to Cockerill-Ougree, Societe Anonyme, Seraing, Belgium
Filed Oct. 12, 1959, Ser. No. 845,768
Claims priority, application Belgium Oct. 14, 1958
3 Claims. (Cl. 213—220)

My invention relates to a device for railway vehicles, particularly for locomotives, and more particularly to devices designed to withstand longitudinal buffering stresses.

It is known in the art to provide railway vehicles with buffering fittings having a given retractive travel which brings into play a counter force, either by the deformation of a resilient member, or by dry friction of surfaces pressed together, or by viscous friction of sufficiently conjugate surfaces, or by a combination of these various features.

Generally speaking, these devices cannot absorb sufficient kinetic energy to protect the structure of the vehicles against the effects of excessive buffer stresses which, although only occurring occasionally, are still too frequent for the considerable damage they cause to the structure of the vehicle to be overlooked.

It has been suggested that the travel of the buffers should be extended, but this is not generally possible.

It has also been suggested that behind the shock absorbing device should be placed a second device with a relatively large travel as compared to the aforenoted known devices wherein the stress is regulated by the pressure of the application of several surfaces in friction against one another. But such a device is very complicated and the force which it is possible to obtain is insufficient.

The object of the invention is to overcome these drawbacks, and to this end the invention contemplates the provision, as an improvement of conventional shock absorbing appliances, of concentric annular and tubular elements which are designed to withstand longitudinal buffering stresses without axial displacement while the energy is not in excess of a certain predetermined value, and with axial displacement when the energy to be dissipated exceeds said certain predetermined value.

In an embodiment of the invention, a cylindrical tube is fixed to the end of each shock absorbing appliance and second and third tubes are mounted concentrically to the exterior of this first tube, the third tube being rigidly fixed to the structure of the vehicle, preferably more or less at the axis of a longitudinal element subjected to the stresses with a minimum tendency to retract.

The first and second tubes, and the second and third tubes are reciprocally engaged with a light rocking in such a way that the assembly, not having any play, is thus a perfectly rigid base for the shock absorbing appliance. The end of the first tube, facing the point where the shock absorbing appliance is fixed, has a conical portion with walls of a greater thickness than the rest of the tube, and this conical part is in contact with a conical part solid with the second tube, which is held against retractile stresses by means of a collar which is supported on the front end of the third tube. As the first tube retracts its conical part it dilates the conical part of the second tube, thus setting up a counter-stress proportional to the strength of the structure of the vehicle.

The assembly thus formed is strong and simple, and can be adapted to widely differing stresses without any great variation in size. These stresses are made as high as possible in relation to the structural strength of the vehicle in order to reduce to a minimum the occasions on which the device comes into play, since these occasions are accompanied by a permanent retraction of the shock-absorbing appliance. However, when a retraction has taken place the original position can be restored by introducing a sleeve or suitable tubular element. This operation is repeated till the power of dilation of the frusto-conical portion of the second tube is exhausted. A very considerable refitting operation then becomes necessary, but this is localized to the zone of the device which forms the subject matter of the invention.

An embodiment of the invention will be described by way of example with reference to the accompanying drawing which shows a section through a horizontal plane in which lies the axis of the device.

As shown in the drawing, a conventional shock-absorbing appliance is assembled on a plate 1 supported on a wall 12 to which plate is connected a tube 2, which is cylindrical for a considerable part of its length and ends with a conical portion 9. The steel of at least this conical portion 9 of the tube 2 is comparatively hard and said conical portion 9 has walls whose thickness is greater than that of the rest of the tube 2. The tube 2 is lightly locked inside a tube 3, of very ductile steel, which tube 3 also terminates in a conical portion 10.

A tube 4 rigidly fixed to the structure of the vehicle represented by central portions 5 the planes of which are parallel to the axis of the tubes and sheets 6 and 7 perpendicular to this axis, holds the tube 3 with a loose fit. At the end of said tube 4 on the shock-absorbing appliance side is a collar 8 resting against the tube 3.

A collar 11 may optionally be placed at the other end of the tube 4 and is intended to keep the commencement of dilation of the tube 3 from the end of the tube 4 and the metal sheet 7.

When the tube 2 is subjected to sufficient axial stress, it moves, dilating the conical end 10 of the tube 3. This dilation is accompanied by a deformation of the cylindrical portion in front of the conical portion, from the collar 11 onwards, when this exists, and from the end of the tube 4 when there is no collar 11.

At the collar 11 it is possible, when the travel has finished, to cut off the deformed end, making the cut in the thickness of the collar 11 and allowing cylindrical portions to remain the extraction of which can be effected by means of suitably arranged jacks.

What I claim is:

1. Buffering apparatus for a railway vehicle in combination with a conventional shock absorber, said apparatus comprising: a first cylindrical tube having one end rigidly secured to said shock absorber, said first tube having an end opposite to said one end of tapering section, a second cylindrical tube co-axially on the first tube and in frictional engagement therewith, said second tube including a tapering section engaging the tapering section of the first tube, and a third tube rigid with the vehicle coaxially and frictionally holding the second tube at its outer periphery, said third tube having an outer end and including a holding flange at said outer end adjacent the second tube to prevent axial movement thereof, the said tubes cooperating together such that upon application of a predetermined axial stress to said first tube the conical part of the first tube axially retracts and dilates the conical part of the second tube whereby a counter stress proportional to the strength of the structure of the vehicle is induced.

2. Buffering apparatus for a railway vehicle in combination with a conventional shock absorber, said apparatus comprising: a first cylindrical tube having one end rigidly secured to said shock absorber, said first tube having an end opposite to said one end of tapering section, a second cylindrical tube coaxially on the first tube and in frictional engagement therewith, said second tube including a tapering section engaging the tapering section of the first tube, the tapering section of the first tube having walls of a greater thickness than the cylindrical portion of the tube, said second tube being of ductile material, and a third tube rigid with the vehicle coaxially and frictionally holding the second tube at its outer periphery, said third tube having an outer end and including a holding flange at said outer end adjacent the second tube to prevent axial movement thereof, the said tubes cooperating together such that upon application of a predetermined axial stress to said first tube the conical part of the first tube axially retracts and dilates the conical part of the second tube whereby a counter stress proportional to the strength of the structure of the vehicle is induced.

3. Apparatus as claimed in claim 1 wherein the tapering section of the first tube has a thickness greater than the thickness of the remainder of the first tube, the tapering section of the second tube has a thickness greater than the thickness of the remainder of the second tube, and said second tube is more ductile than said first tube.

References Cited in the file of this patent

UNITED STATES PATENTS

| | | |
|---|---|---|
| 2,357,123 | Maxwell | Aug. 29, 1944 |
| 2,615,373 | Pegard | Oct. 28, 1952 |
| 2,679,681 | Resler | June 1, 1954 |
| 2,857,056 | Dilworth | Oct. 21, 1958 |
| 2,919,741 | Strock et al. | Jan. 5, 1960 |